United States Patent
Templeton et al.

(10) Patent No.: US 8,720,484 B2
(45) Date of Patent: May 13, 2014

(54) FUEL SYSTEM AND METHOD FOR ASSEMBLING THE SAME

(71) Applicant: Vitec, LLC, Detroit, MI (US)

(72) Inventors: Ryan Templeton, Canton, MI (US); Marc Renaud, Stoney Point (CA); Karim Amellal, Tecumesh (CA); Chadl Farran, Windsor (CA)

(73) Assignee: Vitec, LLC, Detroit, MI (US)

( * ) Notice: Subject to any disclaimer, the term of this patent is extended or adjusted under 35 U.S.C. 154(b) by 71 days.

(21) Appl. No.: 13/652,075

(22) Filed: Oct. 15, 2012

(65) Prior Publication Data

US 2013/0061940 A1 Mar. 14, 2013

Related U.S. Application Data

(63) Continuation of application No. 12/351,988, filed on Jan. 12, 2009, now abandoned.

(60) Provisional application No. 61/023,559, filed on Jan. 25, 2008.

(51) Int. Cl.
*F16K 37/00* (2006.01)

(52) U.S. Cl.
USPC .............................. 137/558; 73/306

(58) Field of Classification Search
USPC ............... 137/554, 558; 285/93; 73/305, 306; 200/52 R–61.93
See application file for complete search history.

(56) References Cited

U.S. PATENT DOCUMENTS

| | | | | |
|---|---|---|---|---|
| 2,889,089 A * | 6/1959 | Herrick et al. | ................. | 222/540 |
| 3,222,088 A * | 12/1965 | Haeber | ........................... | 285/18 |
| 3,643,987 A * | 2/1972 | DuPont | ........................ | 285/205 |
| 4,188,969 A * | 2/1980 | Lotton et al. | .................. | 137/264 |
| 6,851,427 B1 * | 2/2005 | Nashed | ..................... | 128/205.23 |
| 2001/0017134 A1 * | 8/2001 | Bahr | ......................... | 128/204.18 |

* cited by examiner

*Primary Examiner* — John K Fristoe, Jr.
*Assistant Examiner* — Angelisa Hicks
(74) *Attorney, Agent, or Firm* — Honigman Miller Schwartz and Cohn LLP

(57) ABSTRACT

A fuel system is disclosed. The fuel system includes a fuel tank having a chamber defined by a wall and an electrical circuit associated with the fuel tank. The electrical circuit includes means for determining an amount of fuel disposed within the fuel tank chamber. A portion of the electrical circuit includes a sensor for detecting whether or not the fuel line is properly connected to the fuel tank. A method for assembling a fuel system is also disclosed.

9 Claims, 3 Drawing Sheets

FUEL SYSTEM AND METHOD FOR ASSEMBLING THE SAME

RELATED APPLICATION

This disclosure is a continuation application of U.S. application Ser. No. 12/351,988 filed on Jan. 12, 2009 which claims the benefit of Provisional Patent Application No. 61/023,559 filed on Jan. 25, 2008.

FIELD OF THE INVENTION

The disclosure relates to fuel systems and to a method for assembling a fuel system.

DESCRIPTION OF THE RELATED ART

Fuel tanks are known in the art. Although conventional fuel tanks are useful, improvements are sought to improve upon conventional designs. Therefore, a need exists in the art for the development of an improved fuel system and to an improved method for assembling the same.

BRIEF DESCRIPTION OF THE DRAWINGS

The disclosure will now be described, by way of example, with reference to the accompanying drawings, in which.

DETAILED DESCRIPTION OF THE INVENTION

The Figures illustrate an exemplary embodiment of a fuel system in accordance with an embodiment of the invention. Based on the foregoing, it is to be generally understood that the nomenclature used herein is simply for convenience and the terms used to describe the invention should be given the broadest meaning by one of ordinary skill in the art.

Figure 1A:
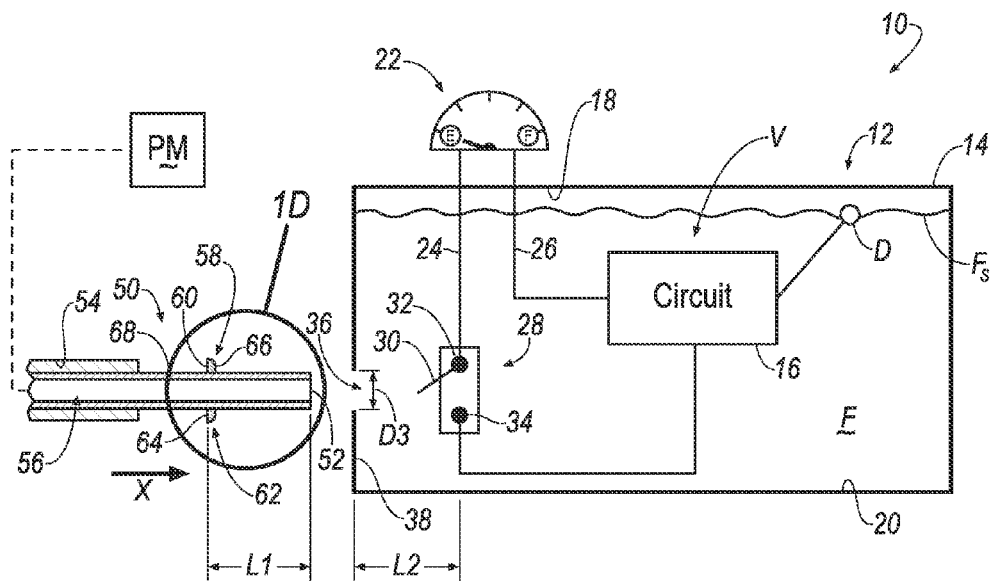
FIG. 1A is a schematic of a fuel system in accordance with an exemplary embodiment of the invention.
Figure 1B:
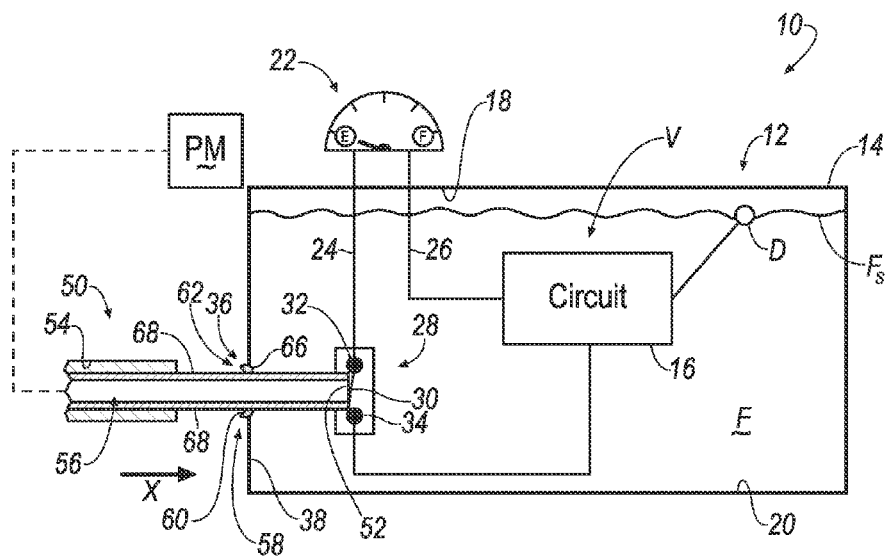
FIG. 1B is a schematic of the fuel system of FIG. 1A in accordance with an exemplary embodiment of the invention.
Figure 1C:
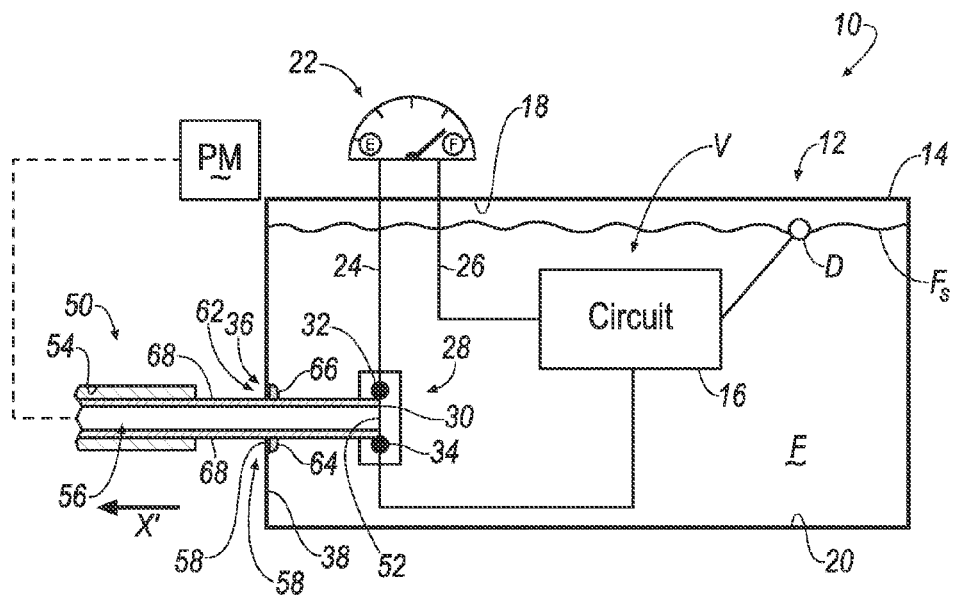
FIG. 1C is a schematic of the fuel system of FIG. 1B in accordance with an exemplary embodiment of the invention.

Referring to FIGS. 1A-1C, a fuel system is shown generally at 10 in accordance with an exemplary embodiment of the invention. In an embodiment, the fuel system 10 generally includes a fuel tank 12. The fuel tank 12 is defined by a wall 14. The wall 14 defines a chamber, V, for containing a volume of fluid, such as, for example, liquid fuel, F.

In an embodiment, the fuel, F, disposed within the chamber, V, of the fuel tank 12 may include a fossil fuel, F. In an embodiment, the fossil fuel, F, may be in a liquid state (e.g., gasoline, ethanol E85, or the like). Alternatively, the fossil fuel, F, may be in a gaseous state (e.g. a natural gas including, for example, hydrogen, methane, ethane, propane, butane, pentane or the like).

In an embodiment, a circuit 16 may be associated with the fuel tank 12. In an embodiment, it will be appreciated that although the circuit 16 is shown disposed within the fuel tank 12 (i.e., within the chamber, V), the circuit 16 may be located to the exterior of the fuel tank 12 (i.e., not within the chamber, V).

In an embodiment, the circuit 16 may function in determining an amount of fuel, F, disposed within the chamber, V, of the fuel tank 12 (i.e., a percentage of the chamber, V, that is occupied by fuel, F). In an embodiment, the circuit 16 may be referred to as a "float circuit" that is connected to a detection device, D (e.g., a buoyant float that is disposed within the fuel tank 12). In an embodiment, the circuit 16 may include, for example, a variable resistor, processor, or other electronic components to support generating an electrical signal responsive to the position of defection device, D.

In an embodiment, circuit 16 in conjunction with the detection device, D, senses the fuel level, which is an indirect measurement of the percentage of the chamber, V, of the fuel tank 12 that is occupied by fuel, F. Accordingly, if, for example, the fuel, F, is liquid gasoline, the detection device, D, may include, for example, a float, that is buoyantly-raised upon an upper-most surface, $F_S$, of the gasoline, F. If, for example, the fuel tank 12 is "full" (i.e., the entire chamber, V, is occupied with the fuel, F), the float, D, may be raised upon the upper surface, $F_S$, of the liquid gasoline, F, toward a top wall 18 of the fuel tank 12, and, as such, the circuit 16 receives this indication from the float, D, in order to determine that approximately 100% of the chamber, V, is occupied by fuel, F. Conversely, if, for example, the fuel tank 12 is "empty," the float, D, is buoyantly-lowered by the upper surface, $F_S$, of the liquid gasoline, F, toward a bottom wall 20 of the fuel tank 12, and, the circuit 16 receives this "low volume" information.

Once the circuit 16 receives a signal from the detection device, D, the amount of fuel, F, contained within the fuel tank 12 is communicated from the circuit 16 to a gauge 22. In an embodiment, one or more of the variable resistor, or processor of the circuit 16 is connected to the gauge 22. In an embodiment, the gauge 22 may include a display that appears, for example, on a vehicle instrument panel in order to provide a visual and/or audible indication to a vehicular operator of the amount of fuel, F, contained within the fuel tank 12.

In an embodiment, the circuit 16 may be further include one or more leads, which are shown generally at 24, 26. In an embodiment, the one of more leads 24, 26 are connected to the gauge 22.

In an embodiment, the one or more leads 24, 26 may be electrically connected to a mechanically activated electrical switch 28, which will be referred to hereafter as a mechanical switch. In an embodiment, the switch 28 may be connected in series with the circuit 16.

In an embodiment, the switch 28 may be orientated in one of two positions, including, for example, an open position (see, e.g., FIGS. 1A, 1B) and a closed position (see, e.g., FIG. 1C). When the switch 28 is orientated in an open position, as shown in FIGS. 1A and 1B, the circuit 16 is said to be "open" and the gauge does not indicate properly (e.g., the gauge 22 may improperly indicate that the fuel tank 12 is "empty"/"E" when it is known to an assembly technician that the fuel tank 12 is substantially "full"/"F"). Conversely, when the switch 28 is orientated in the closed position, as shown in FIG. 1C, the circuit 16 is said to be "closed" and the gauge operates properly (e.g. the gauge 22 will indicate that the fuel tank 12 is substantially "full"/"F" when chamber, V, is completely filled with fuel).

In an embodiment, the switch 28 includes a lever 30 that is biased to be orientated to the open position (see, e.g., FIG. 1A). In an embodiment, the lever 30 may be biased to the open position by a spring (not shown) or the like, and, if the bias/force from the spring is overcome (see, e.g., FIG. 1C), the lever 30 may be moved to the closed position thereby electrically bridging the gap between contacts 32 and 34 and "closing" circuit 16.

In an embodiment, the switch 28 may be disposed proximate and co-axially aligned with an opening 36 defined by the wall 14 of the fuel tank 12. In an embodiment, upon insertion of a component 50 through the opening 36 of fuel tank 12, according to the direction of the arrow, X, an end 52 of the component 50 may engage the switch 28. In an embodiment, engagement of the end 52 of the component 50 with the lever 30 of switch 28 and thereby overcome the open circuit bias of the switch 28 for re-orientating the switch 28 from an open position to a closed position. The fuel tank may include, in the vicinity of the fuel tank opening, a grommet, gasket or other sealing device to prevent fuel from escaping between the interface of component 50 and opening 36.

In an embodiment, the component 50 may be, for example, a portion of a fuel line. In an embodiment, the fuel line 50 includes a wall 54 defining a passage 56 for permitting removal of the fuel, F, disposed within the fuel tank 12 to, for example, a combustion chamber of a prime mover PM, such as an engine, or the like.

Figure 1D:
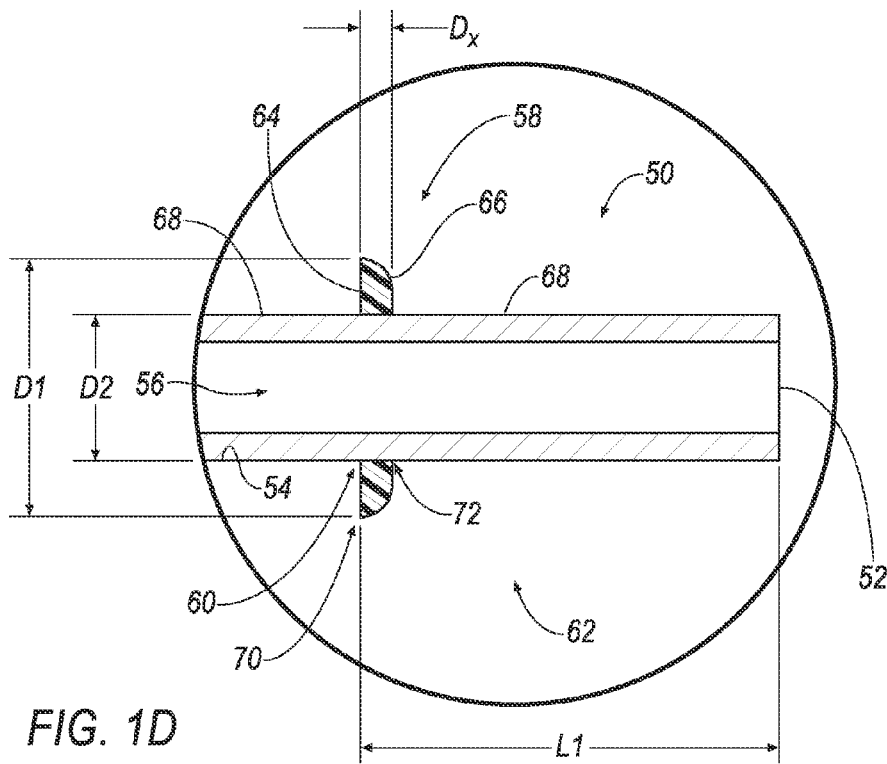
FIG. 1D is an enlarged view of encircled portion 1D of FIG. 1A.

In an embodiment, referring to FIG. 1D, the fuel line 50 may include a resilient bead 58 that is circumferentially disposed about a base 60 of a connecting head 62 of the fuel line 50. In an embodiment, the resilient bead 58 may be defined by a first outer surface 64 and a second outer surface 66. In an embodiment, the first outer surface 64 is substantially perpendicular to an outer surface 68 of the connecting head 62 whereas the second outer surface 66 is substantially non-perpendicular to the outer surface 68 of the connecting head 62. In an embodiment, at least a portion of the second surface 66 may define, in cross section, an arc that extends from the outer surface 68 of the connecting head 62 and terminates at the first outer surface 64 of the resilient bead 58 that extends substantially perpendicularly from the outer surface 68 of the connecting head 62; accordingly, in an embodiment, the second surface 66 may be defined as an arcuate surface and the first outer surface 64 may be defined as a substantially planar surface.

In an embodiment, the resilient bead 58 may be defined by a first end 70 and a second end 72. In an embodiment the first and second ends 70, 72 of the resilient bead 58 may be defined by first and second diameters, D1, D2, respectively, and, the opening 36 may be defined by, for example, a third diameter, D3 (see, e.g., FIG. 1A). In an embodiment, the first diameter, D1, is greater than the second diameter, D2, and, the second diameter, D2, is greater than the third diameter, D3. Further, in an embodiment, it will be appreciated that the second outer surface 66 of the resilient bead 58 defines a non-constant diameter, $D_X$, between the first diameter, D1, at the first end 70 and the second diameter, D2, at the second end 72.

In an embodiment, the resilient bead 58 may include an elastically-deformable material, such as, for example, rubber, silicone, and the like, and the remaining portion of the fuel line 50 defined by the outer surface 68 includes a substantially rigid material. In an embodiment, referring to FIG. 1B, as the connecting head 62 is inserted through the opening 36, the resilient bead 58 may be deformed axially rearwardly and radially inwardly, and, upon passing the connecting head 62 through the opening 36 as seen in FIG. 1C, the resilient bead 58 will restore itself to its original shape.

In an embodiment, the substantially perpendicular orientation of the first outer surface 64 proximate the first end 70 of the resilient bead 58 may further define the resilient bead 58 to function as a sealing surface and a one-way fastener. In an embodiment, as seen in FIG. 1C, upon passing the resilient bead 58 through the opening 36 according to the direction of the arrow, X, the first outer surface 64 may be arranged adjacently-parallel to an inner surface 38 of the wall 14 of the fuel tank 12, and, with the first diameter, D1, of the first end 70 of the resilient bead 58 being greater than the third diameter, D3, of the opening 36, movement of the fuel line 50 according to the direction of the arrow, X', which is substantially opposite the direction of the arrow, X, may be limited or otherwise prevented. Accordingly, upon full insertion of the connecting head 62 through the opening 36, the resilient bead 58 may be disposed adjacent the inner surface 38 of the wall 14 of the fuel tank 12 in order to provide one or more functions of sealing the opening 36 and preventing/limiting movement of the fuel line 50 according to the direction of the arrow, X'.

Further, in an embodiment, as seen in FIG. 1D, the connecting head 62 is defined by a length, L1, extending from the end 52 of the fuel line 50 to the first end 70 of the resilient bead 58. In an embodiment, as seen in FIG. 1A, the length, L1, is approximately equal to a distance, L2, of the switch 28 and the inner surface 38 of the wall 14 of the fuel tank 12. Further, the distance, L2, may be further defined as a distance between the closed position of the switch 28 and the inner surface 38 of the wall 14 of the fuel tank 12.

It will be appreciated that the orientation of the switch 28 to the closed position provides an indication to an assembly technician that the fuel line 50 has been fully and properly seated and coupled to the fuel tank 12. If, for example, the fuel line 50 appears to be properly inserted (see, e.g., FIG. 1B) upon conducting a brief, cursory inspection of the fuel tank 12, the switch 28, however, may not be moved to the closed position, and, as such, the assembly technician may later recognize that the fuel line 50 has been improperly coupled to the fuel tank 12 due to the fact that the switch 28 is not orientated to the closed position, as evidenced by the improper operation of the gauge 22. Accordingly, the assembly technician may conduct a closer, detailed investigation of the connection of the fuel line 50 to the fuel tank 12, and, upon observing that the fuel line 50 is not properly coupled to the fuel tank 12, the connection may be serviced by the assembly technician in order to properly couple the fuel line 50 and the fuel tank 12. Thus, in an embodiment, the switch 28 may function as an electronic verification device that provides an indication that proper insertion and coupling of a fuel line 50 to a fuel tank 12 has been/has not been achieved.

Further, in an embodiment as seen in FIG. 1B, it will be appreciated that if the switch 28 is not moved to the closed position, the connecting head 62 may not be positioned within the opening 36 of the fuel tank 12 in a sealed manner such that the first outer surface 64 of the resilient bead 58 is not disposed adjacent the inner surface 38 of the wall 14 of the fuel tank 12 proximate the opening 36. Accordingly, without otherwise having the benefit of knowing the connection status of fuel line 50 and fuel tank 12 by way of the open/closed orientation of the switch 28, hydrocarbon emissions would be otherwise permitted to escape from the fuel, F, disposed within the fuel tank 12, proximate the opening 36. As such, upon the assembly technician investigating and servicing the connection of the fuel line 50 and fuel tank 12 as described above, the first outer surface 64 of the resilient bead 58 may then be disposed adjacent the inner surface 38 of the wall 14 of the fuel tank 12. By locating the first outer surface 64 of the resilient bead 58 adjacent the inner surface 38 of the wall 14 of the fuel tank 12 proximate the opening 36, a reduction or elimination of hydrocarbon emissions may be provided.

An important aspect of the present invention is that it utilizes components that are already present in the fuel gauge circuit. However, by adding switch 28, to the fuel level circuit, and, by accurately locating the switch 28 with respect to the fuel line opening 30 of the fuel tank 12, the fuel level circuit can also function as a fuel line/fuel tank interface integrity "sensor."

Figure 2A:
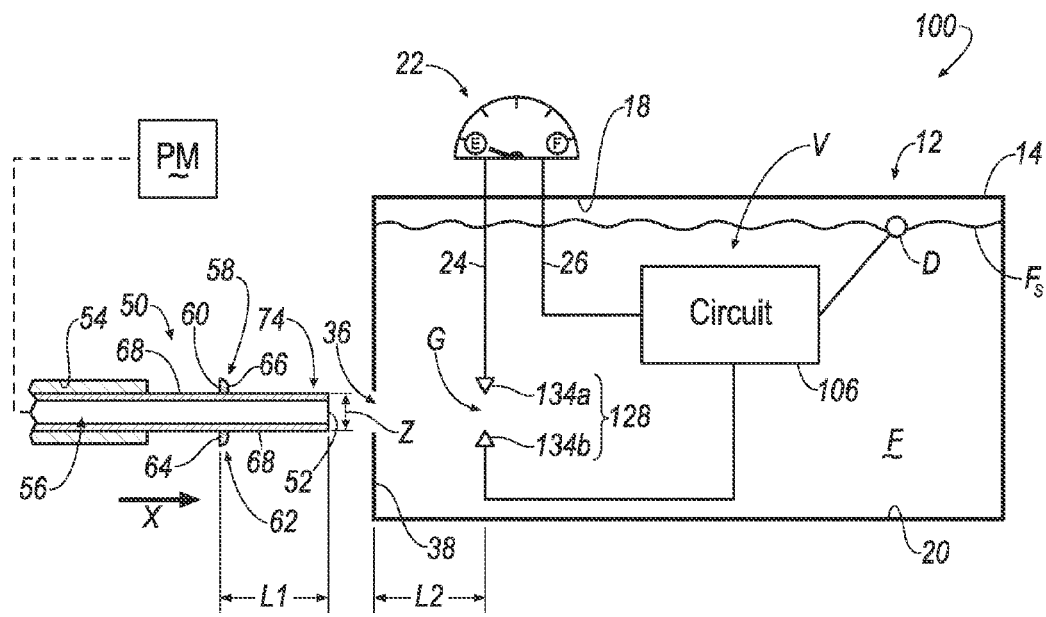
FIG. 2A is a schematic of a fuel system in accordance with an exemplary embodiment of the invention.
Figure 2B:
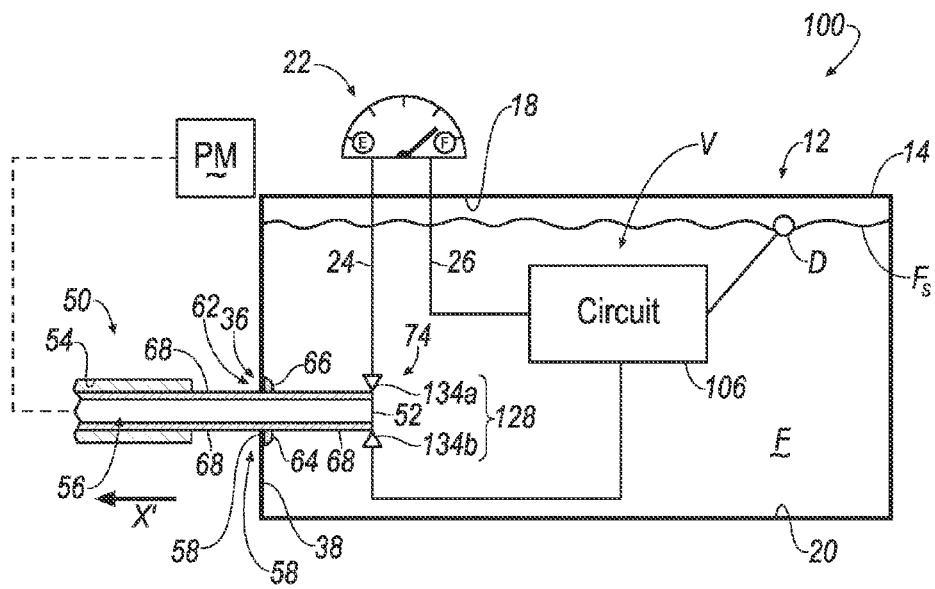
FIG. 2B is a schematic of the fuel system of FIG. 2A in accordance with an exemplary embodiment of the invention.

Referring to FIGS. 2A-2B, a fuel system is shown generally at 100 in accordance with an exemplary embodiment of the invention. In an embodiment, the fuel system 100 is substantially similar to the fuel system 10 with the exception that a component of the fuel system 100, which that is seen generally at 128, is not defined as a mechanical switch 28 including a lever 30. Rather, the fuel system includes a sensor 128 having a pair of opposing electrical contacts 134a, 134b defining a gap, G, therebetween.

In an embodiment, a portion 74 of the outer surface 68 of the connecting head 62 proximate the end 52 of the fuel line 50 may include a dimension, Z, that is substantially similar to that of the gap, G, such that upon insertion of the fuel line 50 through the opening 36 according to the direction of the arrow, X, the portion 74 of the outer surface 68 of the connecting head 62 comes into contact with both of the electrical contacts 134a, 134b (see, e.g., FIG. 2B). In an embodiment, the portion 74 of the outer surface 68 of the connecting head 62 is electrically-conductive, and, as such, engagement of the portion 74 of the outer surface 68 of the connecting head 62 with each of the electrical contacts 134a, 134b results in the electrical contacts 134a, 134b being electrically joined/bridged. When the electrical contacts 134a, 134b are electrically-joined, the sensor 128 re-orientates the circuit 106 from an open circuit configuration (see, e.g., FIG. 2A) to a closed circuit configuration (see, e.g., FIG. 2B).

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A fuel system, comprising:
a fuel tank including a fuel tank wall forming a fuel retaining chamber, a fuel level indicator circuit coupled to said fuel tank, said fuel level indicator circuit including a fuel level detector, a fuel level indicator, and a fuel line position switch, said fuel level indicator circuit effective for indicating the amount of fuel residing in the fuel retaining chamber, wherein said fuel level detector senses an amount of fuel disposed within the fuel retaining chamber, wherein said fuel line position switch selectively contacts said fuel line for sensing a proper position of said fuel line with respect to the fuel tank, wherein said fuel line position switch electronically disables said fuel level indicator circuit when said fuel line is not properly coupled to the fuel line position switch, wherein the fuel line position switch includes a surface portion corresponding to a portion of a fuel line for permitting the portion of the fuel line to physically contact the surface portion of the fuel line position switch, wherein said fuel line position switch disables said fuel level indicator circuit from operating when said fuel line is not properly coupled to the fuel tank, wherein said fuel line position switch includes a mechanically actuated electrical switch, wherein the fuel line position switch includes: a lever, wherein the lever is movable between at least two positions including an open position and a closed position, wherein the open position is defined by the lever being disengaged from the fuel line, wherein the closed position is defined by the lever being engaged with the fuel line, wherein the lever is biased to the open position when the fuel line is not engaged with the lever, wherein the fuel tank forms an opening that permits the fuel line to contact the lever for overcoming the bias of the lever to change the open position of the lever to the closed position of the lever for re-orientating the fuel line position switch from being electrically opened to being electrically closed.

2. A fuel system, comprising:
a fuel tank including a fuel tank wall forming a fuel retaining chamber, a fuel level indicator circuit coupled to said fuel tank, said fuel level indicator circuit including a fuel level detector, a fuel level indicator, and a fuel line position switch, said fuel level indicator circuit effective for indicating the amount of fuel residing in the fuel retaining chamber, wherein said fuel level detector senses an amount of fuel disposed within the fuel retaining chamber, wherein said fuel line position switch selectively contacts said fuel line for sensing a proper position of said fuel line with respect to the fuel tank, wherein said fuel line position switch electronically disables said fuel level indicator circuit when said fuel line is not properly coupled to the fuel line position switch, wherein the fuel line position switch includes: a pair of opposing electrical contacts including a first electrical contact and a second electrical contact, wherein the first electrical contact is spaced from the second electrical contact by a gap, wherein the gap permits said fuel line to contact both of the first electrical contact and the second electrical contact for electrically-joining the first electrical contact to the second electrical contact for orienting the fuel level position switch from being opened to being closed.

3. A fuel system, comprising:
a fuel tank including walls that define a fuel tank chamber, wherein at least one wall of the walls define an opening;
a fuel level detection circuit coupled to the fuel tank; and
a fuel line selectively disposable through the opening and into the chamber, wherein a fully seated position of the fuel line with respect to the fuel tank results in the fuel level detection circuit being closed, wherein a non-fully seated position of the fuel line with respect to the fuel tank results in the fuel level detection circuit being opened, wherein the fuel level detection circuit is connected to a fuel level indicator that is operable when the fuel level detection circuit is closed, wherein the fuel level indicator is not operable when the fuel level detection circuit is opened, wherein the fuel line includes: a distal end, wherein the fuel level detection circuit includes a mechanically activated electrical switch, wherein the mechanically activated electrical switch includes a lever, and an electrical contact, wherein the distal end of the fuel line is engageable with the lever.

4. The fuel system according to claim 3, wherein the lever biases the fuel level detection circuit to be opened.

5. A fuel system, comprising:
a fuel tank including walls that define a fuel tank chamber, wherein at least one wall of the walls define an opening;
a fuel level detection circuit coupled to the fuel tank; and
a fuel line selectively disposable through the opening and into the chamber, wherein a fully seated position of the fuel line with respect to the fuel tank results in the fuel level detection circuit being closed, wherein a non-fully seated position of the fuel line with respect to the fuel tank results in the fuel level detection circuit being opened, wherein the fuel level detection circuit is connected to a fuel level indicator that is operable when the fuel level detection circuit is closed, wherein the fuel level indicator is not operable when the fuel level detection circuit is opened, wherein the portion of the fuel line includes: an electrically-conductive outer surface, wherein the fuel level detection circuit includes a pair of opposing electrical contacts including a first electrical contact and a second electrical contact, wherein the first electrical contact is electrically-isolated from the second electrical contact to define a gap.

6. The fuel system according to claim 5, wherein the electrically-conductive outer surface of the fuel line is arrangeable in a first orientation away from the first electrical contact and the second electrical contact for:

maintaining the fuel level detection circuit in the as being opened by electrically isolating the first electrical contact from the second electrical contact.

7. The fuel system according to claim 5, wherein the electrically-conductive outer surface of the fuel line is arrangeable in a second orientation within the gap and adjacent the first and second electrical contacts for:

electrically-joining the first electrical contact to the second electrical contact to re-orientate the fuel level detection circuit from being opened to being closed.

8. A method for assembling a fuel system, comprising the steps of:

defining a fuel tank to include an opening; connecting a fuel level detection circuit to the fuel tank including a fuel level gauge; providing a portion of the fuel level detection circuit proximate the opening; orientating the fuel level detection circuit in an inoperable, open circuit configuration, prior to insertion of a fuel line component through the opening of the fuel tank such that the fuel level gauge is unable to indicate an amount of fuel disposed within the fuel tank; inserting a fuel line component through the opening of the fuel tank; and utilizing a portion of the fuel line component for engaging the fuel level detection circuit for re-orientating the inoperable, open circuit configuration to an operable, closed circuit configuration such that the fuel level gauge is able to indicate the amount of fuel disposed within the fuel tank, wherein the fuel level detection circuit includes a mechanical switch having a lever and an electrical contact, wherein the orientating step includes: biasing the lever to an open position, wherein the portion of the fuel line includes a distal end of the fuel line, wherein the utilizing step includes utilizing the distal end of the fuel line for engaging the lever, wherein the re-orientating step includes overcoming the biasing of the lever for moving the lever from the open position to a closed position.

9. A method for assembling a fuel system, comprising the steps of:

defining a fuel tank to include an opening; connecting a fuel level detection circuit to the fuel tank including a fuel level gauge; providing a portion of the fuel level detection circuit proximate the opening; orientating the fuel level detection circuit in an inoperable, open circuit configuration, prior to insertion of a fuel line component through the opening of the fuel tank such that the fuel level gauge is unable to indicate an amount of fuel disposed within the fuel tank; inserting a fuel line component through the opening of the fuel tank; and utilizing a portion of the fuel line component for engaging the fuel level detection circuit for re-orientating the inoperable, open circuit configuration to an operable, closed circuit configuration such that the fuel level gauge is able to indicate the amount of fuel disposed within the fuel tank, wherein the fuel level detection circuit includes a sensor, wherein the sensor includes a pair of opposing electrical contacts including a first electrical contact and a second electrical contact, wherein orientating step includes: electrically-isolating the first electrical contact from the second electrical contact by defining a gap there-between, wherein the portion of the fuel line includes an electrically-conductive outer surface of the fuel line, wherein the utilizing step includes arranging the electrically-conductive outer surface of the fuel line within the gap and adjacent the first and second electrical contacts, wherein the re-orientating step includes electrically-joining the first electrical contact to the second electrical contact by way of the electrically-conductive outer surface of the fuel line.

\* \* \* \* \*

UNITED STATES PATENT AND TRADEMARK OFFICE
CERTIFICATE OF CORRECTION

PATENT NO. : 8,720,484 B2
APPLICATION NO. : 13/652075
DATED : May 13, 2014
INVENTOR(S) : Ryan Templeton et al.

Page 1 of 1

It is certified that error appears in the above-identified patent and that said Letters Patent is hereby corrected as shown below:

On the title page:

Item (72) Inventors: Please correct inventor name "Chadl Farran" to --Chadi Farran--

Signed and Sealed this
Tenth Day of February, 2015

Michelle K. Lee
*Deputy Director of the United States Patent and Trademark Office*